(12) United States Patent
Small et al.

(10) Patent No.: US 9,300,766 B2
(45) Date of Patent: Mar. 29, 2016

(54) METHOD AND APPARATUS FOR INITIATING AND MAINTAINING SESSIONS BETWEEN ENDPOINTS

(75) Inventors: David B. Small, Dublin, CA (US); Thomas Spencer, IV, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 433 days.

(21) Appl. No.: 13/563,403

(22) Filed: Jul. 31, 2012

(65) Prior Publication Data

US 2014/0040488 A1 Feb. 6, 2014

(51) Int. Cl.
*G06F 15/16* (2006.01)
*H04L 29/06* (2006.01)
*H04L 29/08* (2006.01)
*H04L 29/12* (2006.01)

(52) U.S. Cl.
CPC .............. *H04L 69/16* (2013.01); *H04L 67/142* (2013.01); *H04L 61/2007* (2013.01); *H04L 61/2076* (2013.01); *H04L 69/22* (2013.01)

(58) Field of Classification Search
USPC ................................................. 709/227–228
See application file for complete search history.

(56) References Cited

U.S. PATENT DOCUMENTS

| | | | |
|---|---|---|---|
| 6,804,776 B1* | 10/2004 | Lothberg et al. | 713/160 |
| 8,493,931 B1* | 7/2013 | Nix | 370/331 |
| 8,661,156 B2* | 2/2014 | Hegde et al. | 709/238 |
| 2002/0103909 A1* | 8/2002 | Devine et al. | 709/227 |
| 2005/0154774 A1* | 7/2005 | Giaffreda et al. | 709/200 |
| 2007/0218912 A1* | 9/2007 | Song et al. | 455/445 |
| 2008/0148379 A1* | 6/2008 | Xu et al. | 726/11 |
| 2010/0217876 A1* | 8/2010 | Fikouras et al. | 709/228 |
| 2010/0306304 A1* | 12/2010 | Cao et al. | 709/203 |
| 2011/0030039 A1* | 2/2011 | Bilange | H04L 63/08 726/5 |
| 2011/0064047 A1* | 3/2011 | Nieminen | 370/331 |
| 2014/0082060 A1* | 3/2014 | Mehta et al. | 709/203 |

OTHER PUBLICATIONS

Agilent Technologies, "Simple IP and Mobile IP", Feb. 26, 2012.*
Williams, "Overlay Path Option for IP and TCP", draft-williams-overlaypath-ip-tcp-rfc-01, Mar. 2012.*
Grayson et al., "Mobile Internet basics: Transport layer mobility challenges", Jan. 10, 2012, Cisco Systems.*
Landfeldt et al., "SLM, A Framework for Session Layer Mobility Management", Jul. 2012, The University of New South Wales, Sydney 2051 Australia.*

* cited by examiner

*Primary Examiner* — Brian J Gillis
*Assistant Examiner* — Amy Ling (57) ABSTRACT

Methods for re-anchoring a transport layer session in a communication network are disclosed. For example, a method receives a request to re-anchor a transport layer session and sends a packet notifying of a transport layer session re-anchor to a peer. The packet includes a header with a session identifier field, and a record type field that indicates that a payload of the packet comprises transport layer session re-anchor information. The method then receives a confirmation of the transport layer session re-anchor notification. Another method receives a packet comprising a notification of a transport layer session re-anchor from a peer. The packet includes a header with a session identifier field, and a record type field that indicates that a payload of the packet comprises transport layer session re-anchor information. The method then updates a session management table and transmits packets to the peer using an updated address received in the notification of the transport layer session re-anchor.

44 Claims, 9 Drawing Sheets

METHOD AND APPARATUS FOR INITIATING AND MAINTAINING SESSIONS BETWEEN ENDPOINTS

The present disclosure relates generally to communication networks and, more particularly, to methods, computer-readable media and devices for initiating, maintaining and transferring sessions between endpoints.

BACKGROUND

Numerous devices are capable of using various technologies to access communications networks for voice, data and other forms of communication. For example, user endpoint devices such as mobile handsets, laptop computers and the like may have the capability to communicate using cellular access technologies (e.g., third generation (3G), fourth generation (4G), long term evolution (LTE), global system for mobile communications (GSM), and the like) as well as packet-based wireless access technologies, such as IEEE 802.11 standard, and others. In general, in various Transmission Control Protocol (TCP)/Internet Protocol (IP) network implementations, the transport layer does not provide end-to-end message transfer capabilities independent of the underlying network. Namely, in the current TCP/IP protocol family, TCP and User Datagram Protocol (UDP) are not independent of the network layer protocol (e.g., IP). Thus, message transfer is enabled between pairs of IP addresses and layer four (L4) port tuples.

SUMMARY

In one embodiment, the present disclosure provides methods and apparatuses for re-anchoring transport layer sessions (e.g., TCP/IP sessions) in a communication network. For example, in one embodiment a method receives a request to re-anchor a transport layer session and sends a packet notifying of a transport layer session re-anchor to a peer. The packet includes a header with a session identifier field and a record type field that indicates that a payload of the packet comprises transport layer session re-anchor information. The method then receives a confirmation of the transport layer session re-anchor notification. In another embodiment, a method receives a packet comprising a notification of a transport layer session re-anchor from a peer. The packet includes a header with a session identifier field and a record type field that indicates that a payload of the packet comprises transport layer session re-anchor information. The method then updates a session management table and transmits packets to the peer using an updated address received in the notification of the transport layer session re-anchor.

BRIEF DESCRIPTION OF THE DRAWINGS

The teachings of the present disclosure can be readily understood by considering the following detailed description in conjunction with the accompanying drawings, in which.

DETAILED DESCRIPTION

The present disclosure provides novel methods and devices for establishing transport layer sessions (e.g., TCP or UDP sessions) where the transport layer is independent of the network layer. For the purpose of this disclosure, the use of the terms "transport layer communication session", "transport layer session", "communication session" and "session" are all referring to a session that is established at the transport layer. In general, in various Transmission Control Protocol (TCP)/Internet Protocol (IP) network implementations, the transport layer does not provide end-to-end message transfer capabilities independent of the underlying network. Namely, in the current TCP/IP protocol family, TCP and User Datagram Protocol (UDP) are not independent of the network layer protocol (e.g., IP). Thus, message transfer is enabled between pairs of IP addresses and layer four (L4) port tuples. As a result, sessions cannot be maintained when the underlying network changes (e.g., if the IP address changes). Application layer solutions do exist which provide only the appearance of session mobility to a user. However, in reality, these solutions involve the establishment of a new TCP/IP session while attempting to hide any delays or interruption from the user.

To address this criticality, the present disclosure provides a novel TCP packet (or segment) structure that enables protocol extensibility and facilitates the transfer, or re-anchoring of a session as the IP address of an endpoint changes, without tearing down the existing session and reestablishing a new session and without tunneling of the connection. Embodiments of the present disclosure will be referred to herein as TCP version 2, or TCPv2. However, it should be noted that TCPv2, as disclosed herein, may replace both TCP as well as UDP. In this regard, it should be noted that embodiments of the present disclosure involve communication sessions at the transport layer, e.g., layer 3 according to the TCP/IP network model, or layer 4 according to the Open Systems Interconnection reference model—in other words, where the current versions of TCP and UDP presently operate. The structure of exemplary TCPv2 packets is described in greater detail below in connection with FIGS. 2 and 4-7.

In general, TCPv2 provides a smaller header compared to TCP, by using a record-command structure. For example, the existing TCP header reserves space for operations, administration and management (OA&M) commands and data such as SYN, ACK, RST and FIN. This is substantially wasteful insofar as there are numerous extraneous bits if there is no OA&M information to transmit in the current packet. In addition, the TCP protocol is minimally extensible as there is practically no space in the header to include new functions. In contrast, TCPv2 achieves a smaller header by elimination of fields from the TCP header structure that can be moved into commands and record types. For example, SYN, ACK, RST and FIN are record types/commands in TCPv2. In addition, TCPv2 is extensible insofar as new OA&M or other message types can be achieved by creating a new record type and definition.

In addition to providing a smaller header, the TCPv2 header introduces session identifier (session ID or SID) fields. For example, a serving system session ID (SSID) field and a receiving system session ID (RSID) field are included in the header, enabling a transport layer session to be tied to these unique identifiers, rather than IP address/L4 port tuples. As such, TCP/IP sessions (using TCPv2) can gracefully navigate a change in network (e.g., watch a movie on a landline-connected tablet, and then switch to a mobility network, seamlessly). For example, a device may transfer from one access network such as a cellular network to another access network, e.g., a wireless LAN via a Wi-Fi network. Sessions can also be transferred device-to-device (e.g., transfer a videoconferencing session from a mobile phone to a personal computer (PC)). The advantage is that the IP address may change but the TCPv2 session will persist. In addition, efficient transport of packets is achieved (e.g., instead of transporting all traffic back to an "anchor point" deep in the network, such as a mobile IP home gateway, a packet data network (PDN) gateway (P-GW, or PGW), a gateway general packet radio service (GPRS) support node (GGSN), and the like, TCPv2 enables shortest-path routing).

Figure 1:
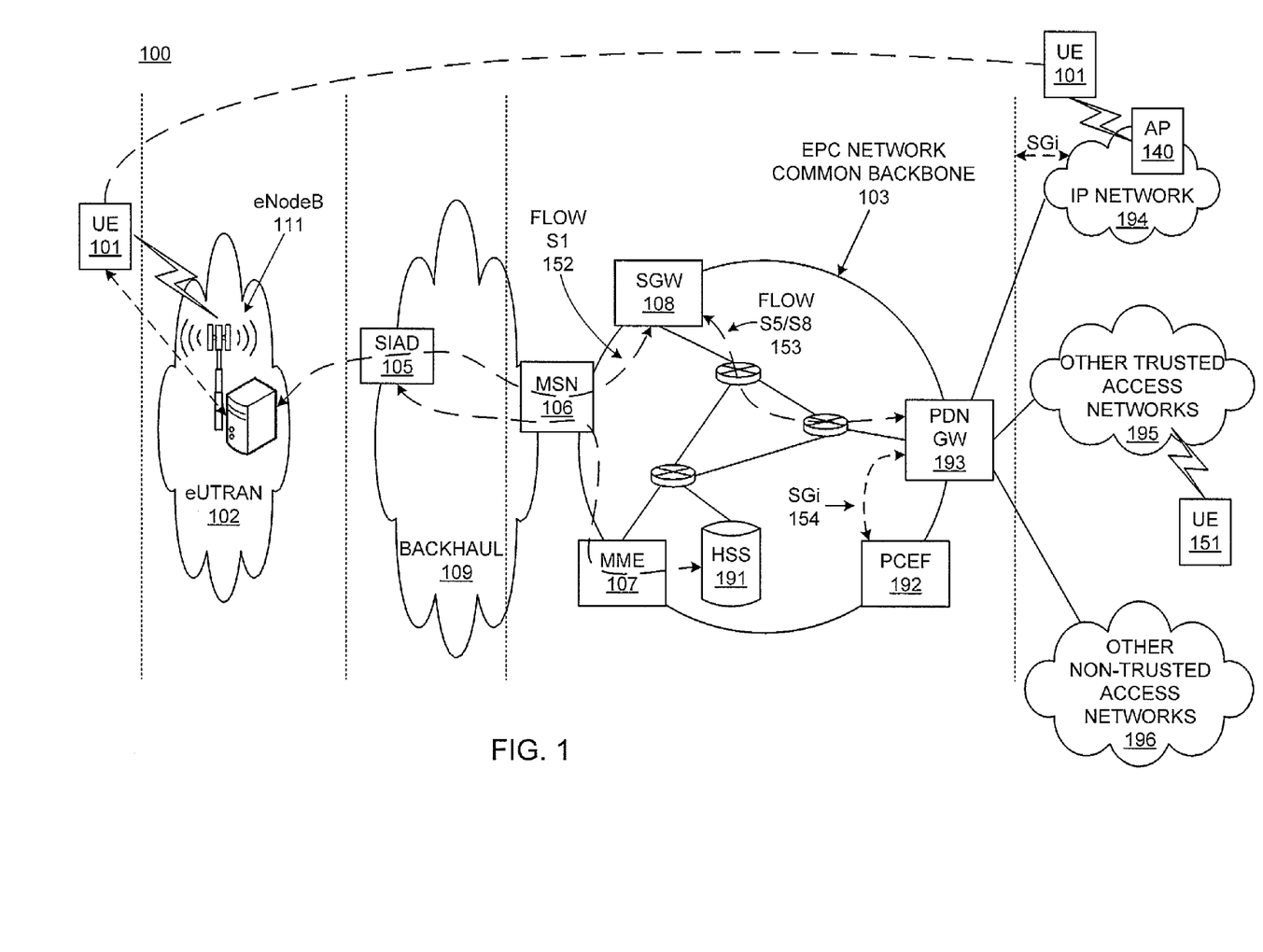
FIG. 1 illustrates an exemplary LTE network related to the present disclosure.

To better understand the present disclosure, FIG. 1 illustrates an exemplary network 100 related to the present disclosure (e.g., a Third Generation Partnership Project (3GPP) Long Term Evolution (LTE) network and the like). Although the present disclosure is described in the context of LTE networks, the disclosure is not so limited. Namely, the present disclosure can be equally applied to other types of networks (e.g., wired networks, such as digital subscriber line (DSL) networks, cable networks and optical networks, wireless networks, such as IEEE 802.11 (Wi-Fi) networks and WiMAX networks, other cellular network such as Global System for Mobile Communications (GSM) Enhanced Data rates for GSM Evolution (EDGE) networks and Universal Mobile Telecommunications System (UMTS) code division multiple access (CDMA) networks, satellite networks, etc.), as well communications traversing various combinations of such networks. In one illustrative embodiment, the LTE network 100 comprises an access network 102 (e.g., an evolved Universal Terrestrial Radio Access Network (eUTRAN)), a backhaul network 109, a core network 103 (e.g., an Evolved Packet Core (EPC) network). Furthermore, although various networks are shown as separate networks in FIG. 1, it is possible that functions performed by these networks can be combined into fewer networks or expanded into a greater number of networks depending on the deployment requirements.

In one illustrative example, the eUTRAN, e.g., eUTRAN 102, may comprise one or more evolved NodeBs (eNodeBs), e.g., 111. In operation, an endpoint device such as user equipment (UE) 101 may access wireless services via an eNodeB, e.g., eNodeB 111 in the eUTRAN 102. UE 101 can be a smart phone, a cellular phone, a computing tablet, a computer or laptop, or any endpoint communication device equipped with wireless capabilities. An eNodeB, such as eNodeB 111, provides wireless interfaces to one or more UE devices. All eNodeBs in the eUTRAN 102 are connected to the EPC network 103 via one or more integrated access devices 105 (e.g., a Smart Integrated Access Device (SIAD)) located in a backhaul network 109. Broadly, an integrated access device is capable of integrating both voice and data services within a single device. In one embodiment, eNodeB 111 supports wireless services covered by one or more cell sites located in eUTRAN 102. It should be noted that any number of eNodeBs can be deployed in eUTRAN 102.

In one embodiment, eUTRAN 102 is connected to the EPC network 103 via the backhaul network 109. For example, SIAD 105 in the backhaul network 109 is connected to the EPC network 103 via a Multi-service Node (MSN) 106. An EPC network provides various functions that support wireless services in the LTE environment. In one embodiment, an EPC network is an Internet Protocol (IP) packet core network that supports both real-time and non-real-time service delivery across a LTE network.

In one embodiment, a SIAD is a device that provides wireless traffic aggregation and backhaul from a cell site to an EPC network. A Multi-Service Node (MSN) provides layer 2 and layer 3 networking functions for wireless service between one or more SIADs and the EPC network. The eUTRAN 102 is the air interface of the 3GPP's Long Term Evolution (LTE) specifications for mobile networks. Namely, the eUTRAN comprises a radio access network standard that will replace previous generations of air interface standards. In one embodiment, the SIAD 105 and the MSN 106 communicate over a backhaul network 109. The backhaul network may also be referred to as a metro Ethernet transport network.

In EPC network 103, network devices such as Mobility Management Entity (MME) 107 and Serving Gateway (SGW) 108 support various functions as part of the LTE network 100. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as a mobility anchor for the user plane during inter-eNodeB handovers.

In addition, EPC (common backbone) network 103 may comprise a Home Subscriber Server (HSS) 191 that contains subscription-related information (e.g., subscriber profiles), performs authentication and authorization of a wireless service user, and provides information about the subscriber's location. The EPC network 103 may also comprise a Policy and Charging Enforcement Point (PCEF) 192 that supports accesses to subscriber databases and specialized functions of a charging system. The EPC network 103 may also comprise a Public Data Network Gateway (PDN GW) 193 (which may also be referred to as a packet data gateway (PDG or PGW) or evolved packet data gateway (ePDG)) which serves as a gateway that provides access between the EPC network 103 and various data networks, e.g., other IP networks, trusted or non-trusted networks 194-196 and the like. In one embodiment, a PDW may serves as an anchor for mobility between LTE and other wireless technologies, such as 2G and 3G wireless networks.

In one embodiment, the eUTRAN network 102, the backhaul network 109 and the EPC network 103 include various data bearer paths and signaling bearer paths, which may be referred to by specific labels. For example, the data bearer path on line 152 may be referred to as an S1-U bearer path and the data bearer path on line 153 may be referred to as an S5 or an S8 bearer path. In another example, the signaling bearer path between the eUTRAN and the MME 107 may be referred to as an S1-MME bearer path. Shown illustratively in FIG. 1, the S1 interface flow 152 is used to provide communication between an eNodeB, such as eNodeB 111, and a device in the EPC network 103, such as MME 107 and/or SGW 108. The SGi interface flow 154 is used to provide communication between the PGW 193 (also referred to as PDN GW 193) and the PCEF 192. The S5/S8 interface flow 153 is used to provide communication between the SGW 108 and PGW 193. It should be noted that the S1, S5, S8 and SGi interfaces are standard interfaces defined by the 3GPP standard. However, the present disclosure is not limited to these specific interfaces. In addition, it should be noted that LTE network 100 of FIG. 1 is only illustrative in nature. Thus, the number of network components or elements is not specifically limited as shown, and any number of network components or elements can be deployed.

Figure 2:
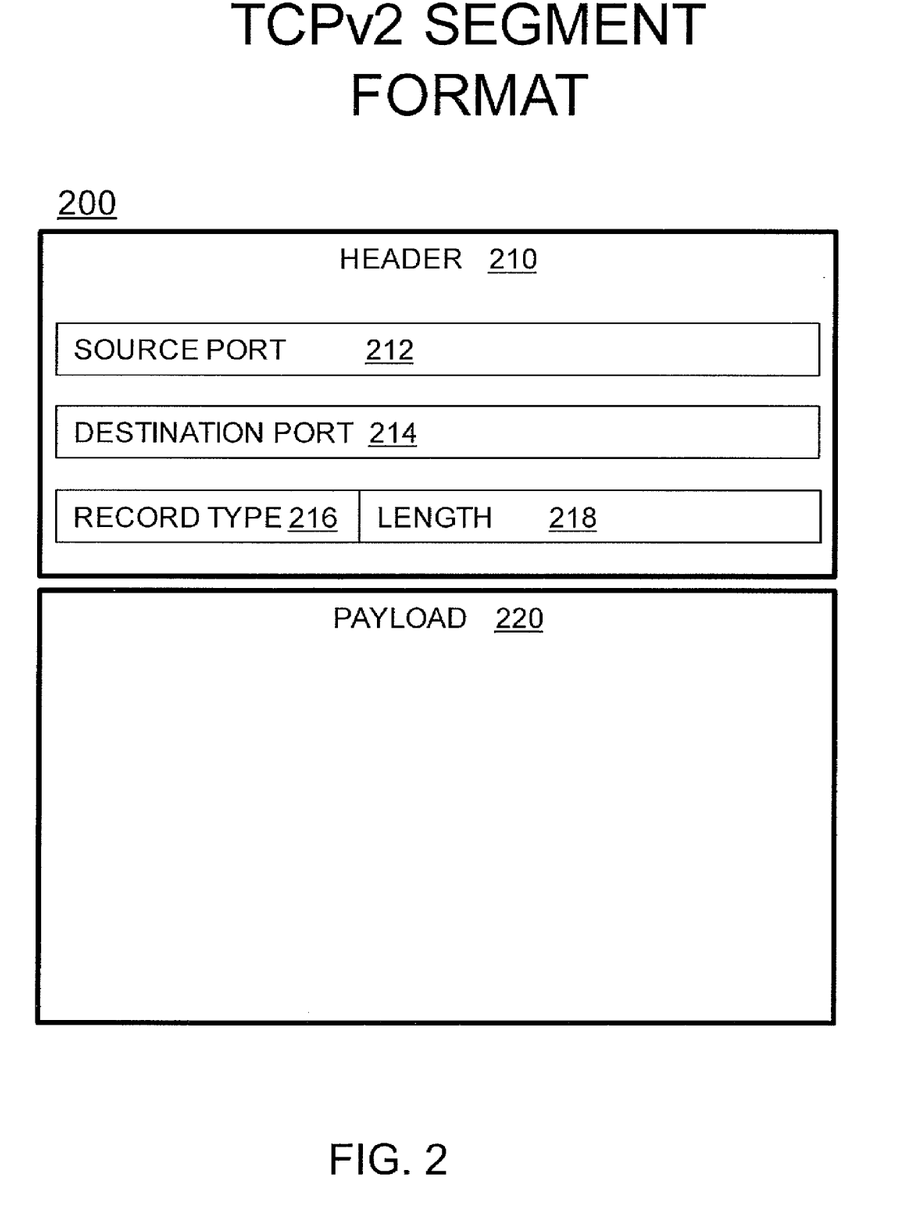
FIG. 2 illustrates an exemplary packet format, according to the present disclosure.

FIG. 2 illustrates an exemplary TCPv2 packet (or segment) format. It should be noted that TCP terminology generally refers to the data structure as a "packet" or "segment" whereas other protocols, such as user datagram protocol (UDP) refer to a "datagram." In the context of the present disclosure, all of these terms are used interchangeably, referring to a transport layer (e.g., according to both the TCP/IP network model and/or the Open Systems Interconnection (OSI) model) data structure for transmission of information over a communication network. A shown in FIG. 2, the TCPv2 packet 200 includes a header 210 and a payload 220. Within the header there are several fields including a source port field 212, a destination port field 214, a record type field 216 and a length field 218. Notably, the source port and destination port fields do not correspond to the well know ports as used in TCP. Rather, the destination port field is reserved for carrying a requesting system session ID (RSID) and the source port field is reserved for carrying a serving system session ID (SSID). The RSID and SSID are unique values selected by the requesting system and the serving system respectively, and are used to uniquely identify a TCPv2 session. Notably, the session identity has no dependence upon the IP addresses of the hosts (i.e., the requesting and serving system). In one embodiment, each of the hosts selects its own session ID and shares the selected session ID with the other host. In one embodiment, each of the session IDs is a 32 bit word. Hence, the source port and destination port fields of the header of TCPv2 packet 200 reserve 32 bits each for each of the RSID and SSID. It should be noted that the size of the session IDs is not a limiting factor of the present disclosure such that the session IDs can be any "n-bit" word, where n is an integer.

The exemplary header of a TCPv2 packet 200 also includes a record type field 216. The record type field is reserved for a record type, which indicates the type of payload of the packet. Exemplary record types include, DATA, HELLO, ACK, NULL and REAN, among others. For example, a DATA record type may indicate a payload with actual application data, a NULL record type may indicate an initial desire to establish a session with a receiving host, a HELLO data type may indicate that the payload comprises information in connection with a session setup, an ACK record type may indicate that the payload includes acknowledgement information, while a REAN record type may indicate the payload contains re-anchoring information. Several exemplary record types are discussed in greater detail below in connection with FIGS. 4-7. The exemplary TCPv2 packet 200 also includes a length field 218, indicating a length of the packet. This helps prevent exploits that seek to append additional data to a packet. Since the recipient will know the last valid bit of data for each packet based upon the length indicated in the length field, any bits beyond those indicated in the length field can be ignored, discarded or quarantined for further analysis. The exemplary TCPv2 packet also includes a payload. The length, structure and contents of the payload will vary depending upon the particular record type and purpose of the packet. FIGS. 4-7 provide more detailed examples and are discussed below in connection with the exemplary methods 300 and 800.

Figure 3:
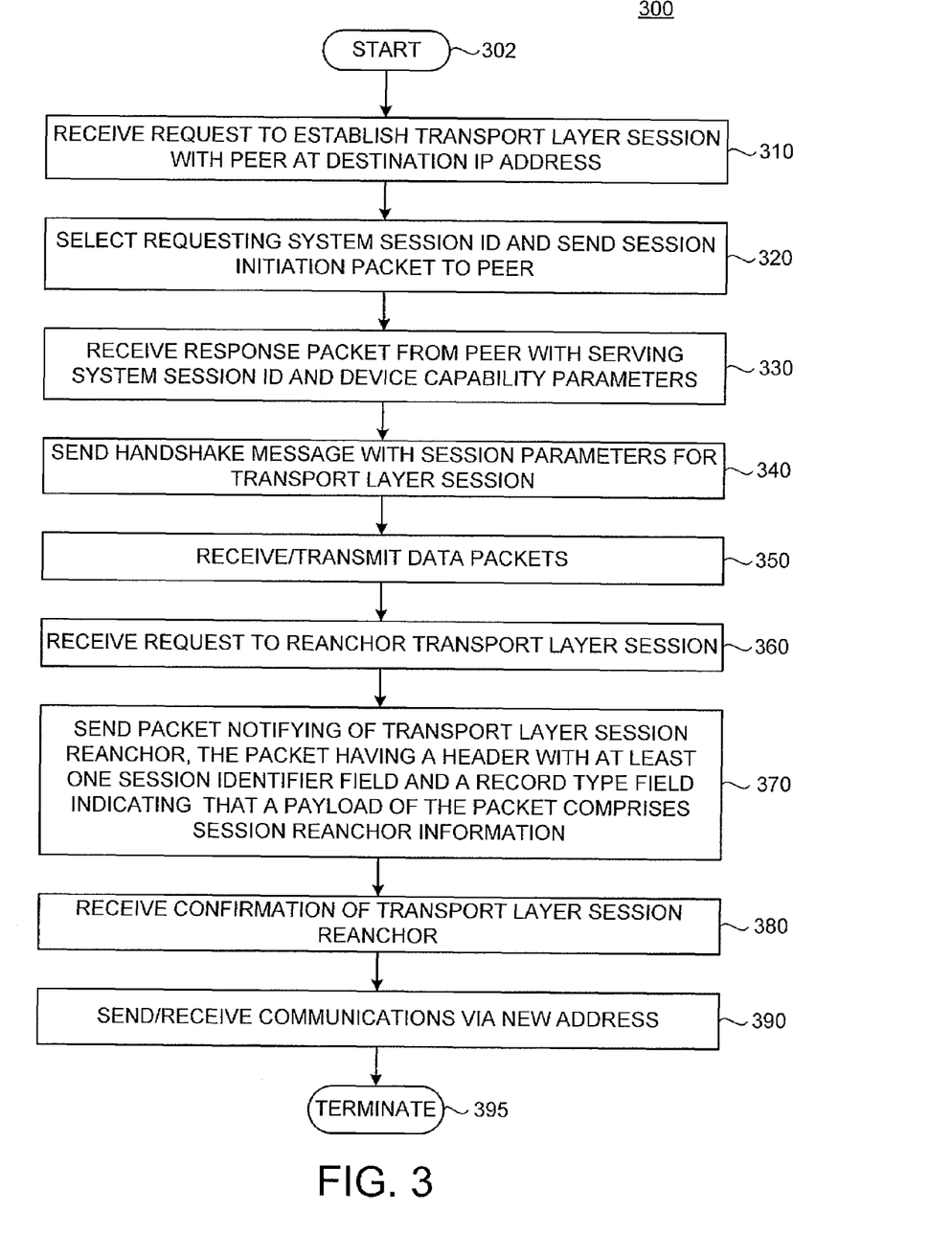
FIG. 3 illustrates a flowchart of a method for establishing and re-anchoring a transport layer session, according to the present disclosure.

FIG. 3 illustrates an exemplary method 300 for establishing and re-anchoring a transport layer session using TCPv2 packets. In one embodiment, the method 300 may be performed by a device or a system that is a requesting system/host of an ongoing session with a serving system/destination host. For example, the method 300 may be performed by UE 101 that is in a communication session with UE 151 in FIG. 1. In one embodiment, the steps/functions/operations of method 300 may be performed by a computing device 900 as described in connection with FIG. 9.

The method 300 begins in step 302 and proceeds to step 310 where the method receives a request to establish a transport layer session with a host at a destination IP address. For example, a user application on a requesting host/device (e.g., a HTTP application, web browsing application, media player application, voice/telephony application, etc.) may wish to establish a connection to a server to receive content or engage in two-way communication. For example, a domain name service (DNS) lookup may have already been performed and the application has learned the IP address of the proper server, or destination host, to obtain desired content, such as streaming video. The application layer may pass this IP address information to the transport layer to establish a session.

Figure 4:
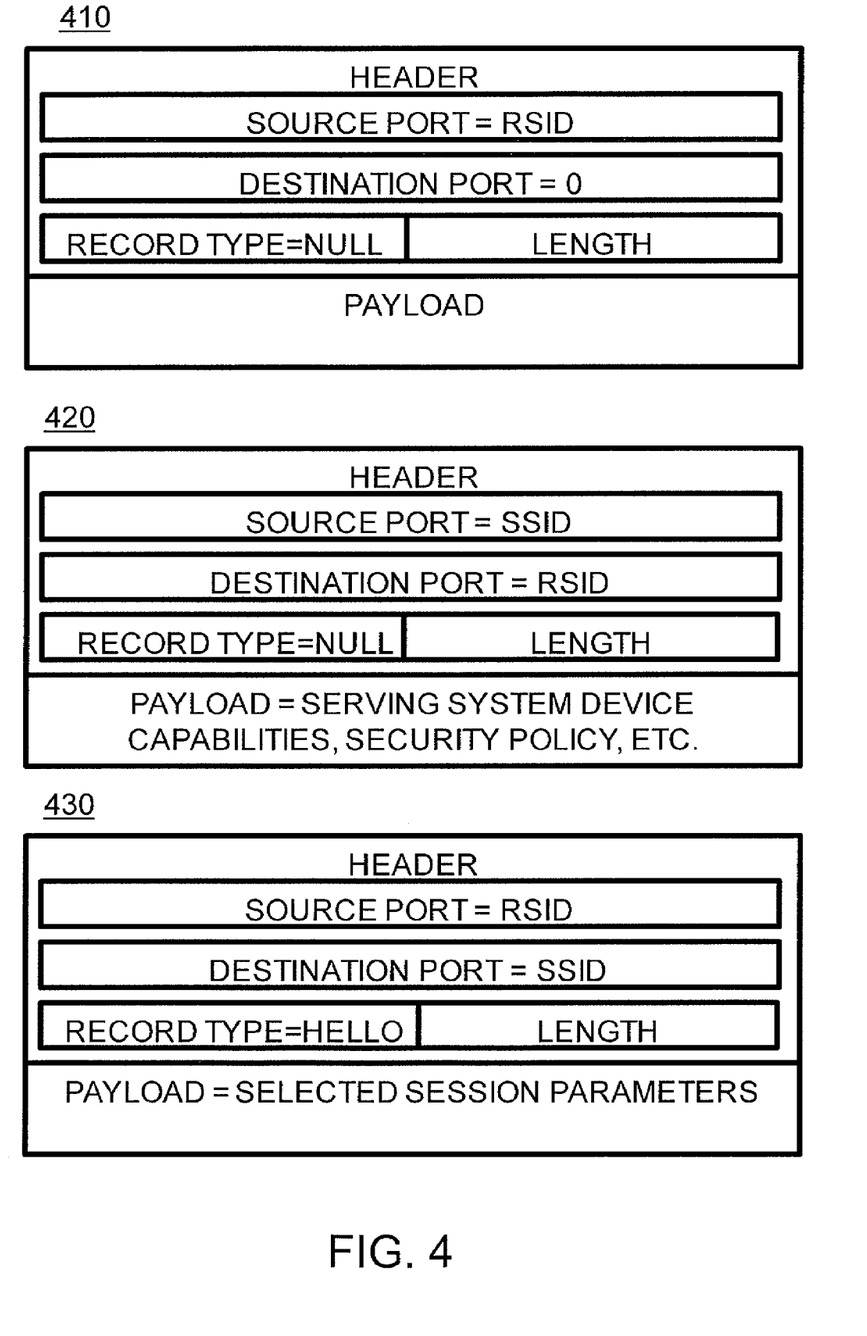
FIG. 4 illustrates an exemplary packet for initiating a session, according to the present disclosure.

At step 320, the method 300 selects a requesting system session ID (RSID) for establishing a TCPv2 session with the destination host. In one embodiment, the RSID is a 32 bit word selected randomly and/or according to a particular selection algorithm from a range of available RSIDs. The method then sends a packet to the destination IP address with a source port field in the packet header containing the RSID. For example, the method may send a new session notification packet to a destination host indicating a desire to establish a session with the destination host. In one embodiment, the packet header includes a record type of NULL in the record type field to indicate that the packet is a request to establish a new session. An exemplary new session notification packet 410 is shown in FIG. 4.

At step 330, the method 300 receives a response packet from the destination host acknowledging that the new session notification packet was received. In one embodiment, the response packet includes such information as the destination host's device capabilities, security policy and the like. In addition, in one embodiment the response packet indicates a serving system session ID (SSID) selected by the destination host (or "serving system"). An exemplary response packet 420 is shown in FIG. 4. In one embodiment, the nature of the packet as a response packet is also indicated by the record type of NULL.

At step 340, the method 300 sends a handshake message, or "hello" message with session parameters. For example, at step 330, the method receives the devices capabilities, security policy and the like from the destination host. As such, the method 300 can select appropriate session parameters for the transport layer session with the destination host. For example, if the destination host is reachable over an access network that only supports packets with a maximum length of X, then the method may select a maximum packet size of less than or equal to X for the transport layer session. For instance, if the requesting host or the access network of the requesting host is only capable of supporting packets up to length Y (where Y is smaller than X), the method 300 may select size Y packets as the maximum packet length and notify the destination host of this parameter. In one embodiment, session information may further comprise a timeout parameter and/or various other session parameters of a similar nature. For example, the transport layer session can be kept "alive" by configuring the time an endpoint will remember the session ID. One embodiment of a handshake message 430 is shown in FIG. 4. In one embodiment, the record type field of handshake message 430 contains the record type HELLO, indicating that the payload includes the session parameter information (e.g., maximum packet length, timeout conditions/parameters, etc.). In one embodiment, a further response packet from the destination host acknowledging the session parameters may be received at step 340.

In one embodiment the handshake message 430 is a message that is part of a session key exchange/negotiation to provide enhanced security to the transport layer session. The session key is negotiated using a Diffie-Hellman key exchange protocol. Each of two peers agrees to use a particular prime number and a base. These two numbers may be public. However, each of the two peers then selects a secret number, applies a formula according to Diffie-Hellman and sends the result to the peer device, which applies the inverse of the formula to receive the secret number of the other device. Having selected its own secret number and having determined the secret number of the peer, each of the peers is then able to calculate a shared secret key that can only be created by using both of the secret numbers. Notably, each of the peers is able to calculate the same secret key based upon having both of the secret numbers selected by the peers. The secret key is then used as a "session key." Thus, some or all of the messaging between the peers is then encrypted prior to transmission using the session key. The messaging can only be decrypted by having the session key. Although encryption of all packets is not strictly necessary, it is especially valuable with respect to particular OA&M messages. For example, session key encryption is particularly important with respect to session re-anchoring messages, described in more detail below. More specifically, by using the session key to transmit re-anchor messages, the endpoints can use this key to filter and discard man-in-the-middle attacks, such as malicious reanchoring requests. In other words, once a session key is negotiated between the endpoints (e.g., at session setup/during handshake exchange) it is used as a validator for reanchoring requests.

In one embodiment a modified Diffie-Hellman key exchange is used, which may be referred to herein as the "station to station" protocol. The normal Diffie-Hellman exchange is modified to include a public key signature of the elements to ensure no man-in-the-middle attackers can intercept the communication. As long as one side of the connection uses a real, external public key infrastructure that can be verified by the other peer, no man in the middle attack can be successful. If both sides use "self-signed" certificates in the key exchange, then the session has a small vulnerability to a man-in-the-middle attack during the connection setup, but not later. Although it may be easier to transfer sessions between devices when not "self-signing", a common key ring between devices could be used to overcome this problem. In addition, in one embodiment, the key exchange may be included in the initial message exchange (e.g., at steps 320 and 330, rather than at step 340). In particular the initiator of a session can select the prime number and base, select its secret key and send these numbers to the peer device in the message sent at step 320 and the peer device can do the same at step 330.

At step 350, the method 300 receives and transmits data packets. For example, the method 300 may send and receive TCPv2 packets using the RSID and SSID established in the above steps. In particular, the SSID and RSID may be placed in the destination and source port fields in the TCPv2 header of each of the data packets. In one embodiment, each of the TCPv2 data packets is encapsulated in a network layer header (e.g., an IP header) having at least a source IP address and destination IP address. Notably, no changes to the Internet Protocol or to the IP headers are necessary. TCPv2 packets are compatible with all versions of the Internet Protocol (e.g., IPv4, IPv6, etc.) as well as any other layer 3 protocol (e.g., according to the OSI model). Thus, the encapsulation of a transport layer packet/frame with a network layer IP header may be performed in a manner understood by those skilled in the art.

In addition, each of the hosts may maintain a session management table for the session storing the session parameters, which may include the current IP address of the peer host. Notably, the source 1P address and destination IP address correspond to the initial IP addresses of the requesting host and the destination host at the time the transport layer session is established (e.g., up to and including step 340).

Figure 5:
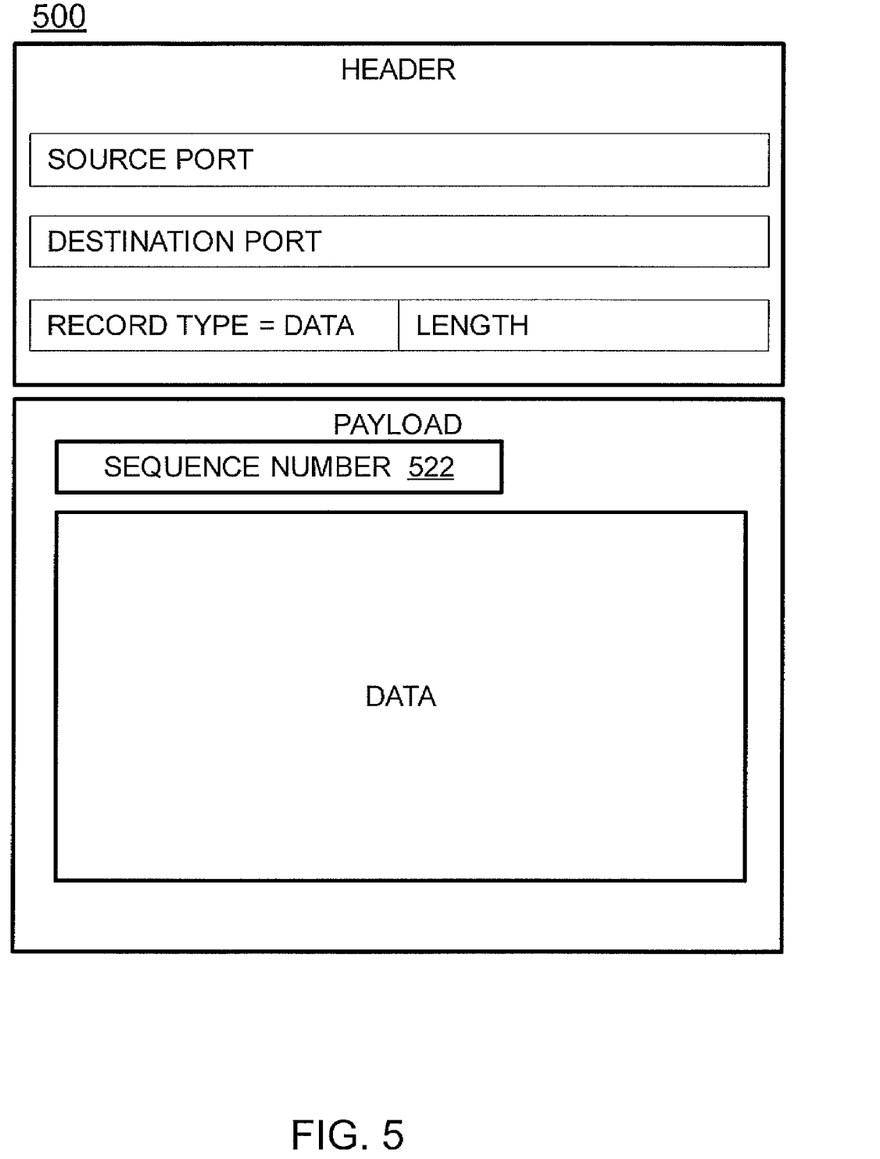
FIG. 5 illustrates an exemplary packet for conveying data, according to the present disclosure.

FIG. 5 illustrates an exemplary TCPv2 data packet 500 according to the present disclosure. The record type field of data packet 500 includes a record type indicating that the packet payload comprises application data (e.g., record type=DATA). The payload of data packet 500 includes a sequence number 522 followed by the actual user/application data. In one embodiment, the sequence number comprises a 16 bit or 32 bit word. The sequence number may be selected (randomly or in accordance with any predefined approach) by the sending host if the packet 500 is the first data packet in a session, or may sequentially follow the sequence number of a previous packet, if the packet 500 is not the first data packet in a session. Notably, the data packet header is relatively smaller, compared to the conventional TCP header. In particular, there is no header space wasted for reserved OA&M messaging. Rather, when it is necessary to convey OA&M messages, information and data, a TCP packet is sent with the appropriate record type indicated in the record type field, along with the OA&M message/data in the payload of the packet.

Figure 6:
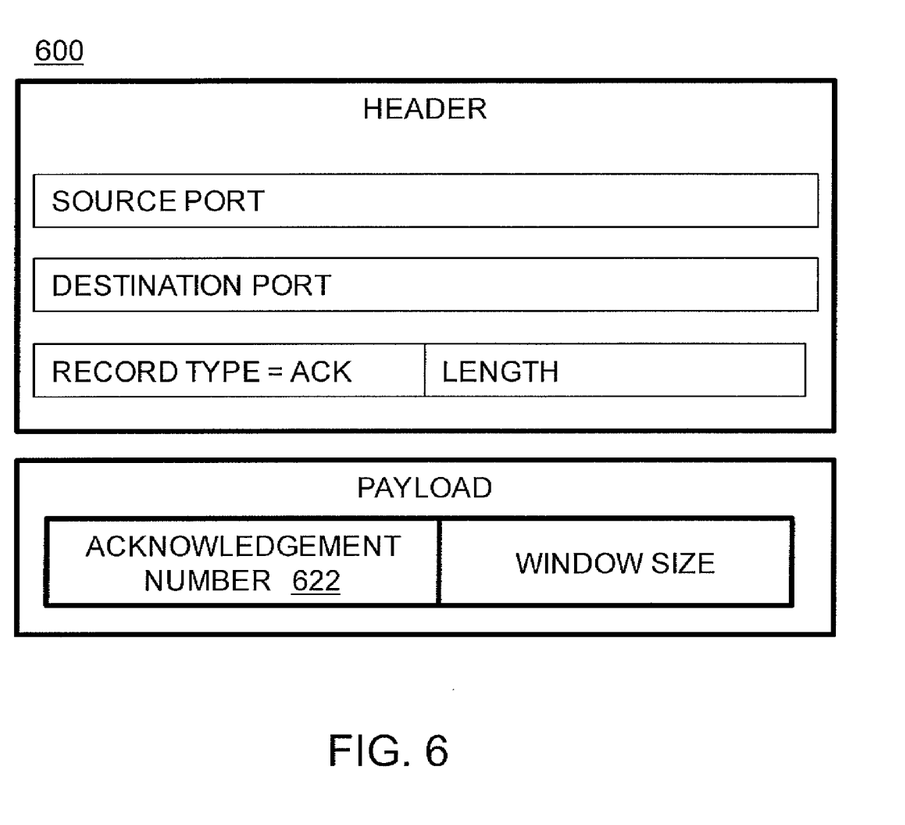
FIG. 6 illustrates an exemplary packet for sending an acknowledgement, according to the present disclosure.

In this regard, FIG. 6 illustrates an exemplary acknowledgment packet 600 (e.g., one of several OA&M message types) according to the present disclosure. As mentioned above, in TCPv2, OA&M functionality that was previously placed in the user data plane via reserved header fields is instead provided through a record type-command structure. For instance, in TCP, acknowledgement of packets received was achieved through periodic use of the acknowledgement field in the TCP header. The recipient would insert a sequence number in the acknowledgment field that corresponded to the sequence number of the last received packet. In TCPv2, acknowledgments are conveyed in a separate acknowledgment packet indicated by a record type (e.g., record type=ACK) along with a payload that includes the sequence number of the last received packet. As shown in FIG. 6, the record type in the header of acknowledgement packet 600 indicates a record type of ACK, indicating that the payload is an acknowledgment message. The source port and destination port may include the RSID and SSID of the session respectively. In one embodiment, an acknowledgement number 622 in the payload of packet 600 indicates the sequence number of the last data packet received. Thus, for example, the requesting host may send a periodic acknowledgment message (e.g., every 100 data packets received, every 1 millisecond, etc.) indicating the sequence number of the last data packet received from the destination/serving host. Accordingly, if there is a problem with the connection between the requesting host and the destination host such that the requesting host fails to receive a number of packets, or does not receive a number of packets within a timeframe specified by a quality of service parameter (e.g., a timeout condition/parameter, and the like), the requesting host can respond appropriately.

At step 360, the method 300 may receive a request to re-anchor a transport layer session. For example, the requesting host or the serving host may change its IP address for any number of reasons. For instance, the requesting host may comprise UE 101 in FIG. 1 and may be communicating with destination host UE 151 in a TCP/IP session (using TCPv2 in accordance with the present disclosure) via an IP address of W.X.Y.Z assigned at the eUTRAN 102 of a LTE cellular network. However, UE 101 may, during the ongoing session, move into an area with a strong signal from a Wi-Fi access point 140 (e.g., in IP network 194) such that UE 101, or the user, may initiate a new connection to the Wi-Fi access point 140. The mobility of UE 101 from the cellular access network (eUTRAN 102) to IP network 194 is illustrated by the dotted line shown in FIG. 1. Accordingly, the Wi-Fi access point 140 in IP network 194 may assign a new IP address to UE 101 (e.g., A.B.C.D). In turn, UE 101 may then seek to continue the ongoing session via the Wi-Fi access point 140 and release the cellular network connection via eUTRAN 102. In one embodiment, the discovery of available alternative access network (e.g., eUTRAN 102, IP network 194, access networks 195 and 196, etc.) is assisted by an Access Network Discovery and Selection Function (ANDSF) which may comprise a module or process residing on an endpoint device itself, or which may comprise an in-network server (e.g., in eUTRAN 102) for providing information to the endpoint device to assist in selecting an appropriate access network. For example, the ANDSF may provide information on signal strength, security policies, bandwidth capacity and the like to assist in making decisions as to which access network(s) to utilize. It should be noted that the foregoing is just one example of a session re-anchoring scenario. Thus, in other, further and different embodiments, a session re-anchoring may involve migration of a session from a WLAN or wired LAN Internet connection to a cellular network, from one LAN or WLAN to another, and so forth.

Figure 7:
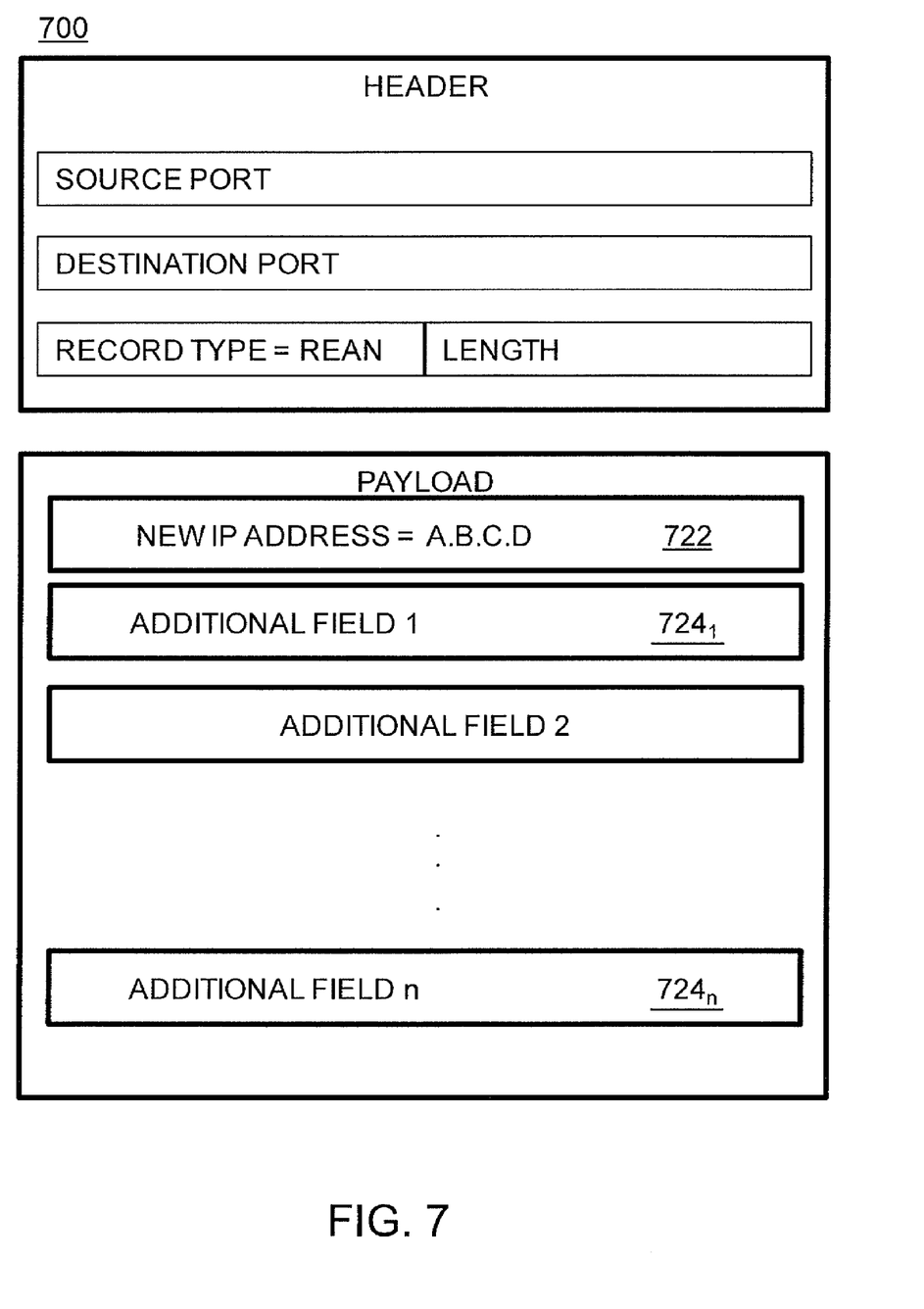
FIG. 7 illustrates an exemplary packet for notifying of a re-anchor, according to the present disclosure.

At step 370, the method 300 sends a packet notifying the destination host of the session re-anchor. In one embodiment, the method sends a session re-anchor packet that includes the new IP address where the requesting host is reachable. An exemplary TCPv2 session re-anchor packet 700 is illustrated in FIG. 7. For instance, the session re-anchor packet 700 includes a record type of REAN in the record type field which indicates that the payload comprises information necessary to effect re-anchoring of the session. At a minimum, the payload includes the new IP address 722 which should be used to reach the requesting host. Thus, as illustrated in FIG. 7, the payload of packet 700 includes at least a New Address field, and may include one or more additional fields 1-n ($724_1$-$724_n$). The destination host may therefore receive the session re-anchor packet and extract the new IP address for the requesting host from the packet. The destination host may update a session management table such that the destination host will begin sending subsequent packets back to the requesting host via the new IP address. More specifically, based upon the update to the session management table, the receiving host will encapsulate any TCPv2 packets being sent back to the sender with a network layer header (e.g., an IP header) including the new IP address as the destination IP address.

In one embodiment, the payload may also include a new session identifier. For example, a new session ID may be included in additional field 1 in packet 700 illustrated in FIG. 7. For instance, the requesting host may, for any number of reasons, seek to change the RSID in connection with the re-anchoring. For instance, the requesting host and the destination host may agree to periodically change session identifiers as a security measure or may agree to change session IDs upon any and all session re-anchors. It should be noted that although various information has been described as being included in the exemplary re-anchor message 700, the present disclosure is not so limited. Namely, a re-anchor packet according to the present disclosure may include other, further and different information and data in addition to, or as an alternative to the types of data described above.

In one embodiment, the packet 700 is encrypted using the session key described above. In particular, during session setup the peer hosts may have selected and negotiated a session key derived from the hosts' respective secret keys. Ideally, only the hosts that were part of the initial session key creation know the session key. As such, authentic session re-anchor messages can be separated from malicious re-anchor requests. For instance, if applying the session key to a received re-anchoring request, only an authentic session re-anchor request should be properly decrypted.

At step 380, the method 300 receives a confirmation of session re-anchor. For example, the destination host may receive a notification of session re-anchor and return an confirmation before actually transmitting subsequent data packets addressed to the new IP address associated with the requesting host (e.g., via an OA&M confirmation packet). Further, in one embodiment, the destination host may actually decline to confirm the session re-anchor request. For instance, the requesting host may seek to migrate the session from a LTE eUTRAN cellular access network to an unsecured and/or untrusted wireless local area network. However, this may violate the security policy of the destination host (e.g., where the destination host is a work/enterprise server and the requesting host is the device of a remote worker of the enterprise, or for any other number of reasons). Accordingly, the destination host may refuse to enable the re-anchoring of the transport layer session by failing to send a confirmation or by sending a negative confirmation to be received by the method 300 at step 380. If, however, the destination host agrees to the session re-anchoring request, it may send a positive confirmation that is received by the method 300 at step 380.

Accordingly, the method 300 proceeds to step 390 where the method receives and sends communications via the new IP address. For example, the destination host may simply begin sending packets with the destination IP address in the IP header set to the new IP address of the requesting host. Since the requesting host requested the re-anchoring to the new IP address, it is prepared to receive subsequent data packets and other packets (e.g., OA&M packets) via the new IP address (e.g., a new IP address obtained from a WLAN).

Notably, the transport layer session re-anchoring is accomplished without direct involvement, management or supervision of any in-network devices. The session hosts themselves coordinate and achieve the session re-anchoring. Since the TCPv2 session is identified only by the SSID/RSID and is not tied to specific IP addresses, the IP addresses of one or both of the hosts can change any number of times during an ongoing TCPv2 session. The source and destination IP addresses of outgoing and incoming packets can be changed essentially at will (e.g., subject to security restrictions such as described above), without regard to the contents of the TCPv2 packets that are encapsulated. In addition, the use of TCPv2 is compatible with all versions of Internet Protocol, and requires no changes to Internet Protocol itself. Thus, a true separation between the network layer protocol and the transport layer protocol is achieved.

Following step 390, the method 300 proceeds to step 395 where the method terminates.

Figure 8:
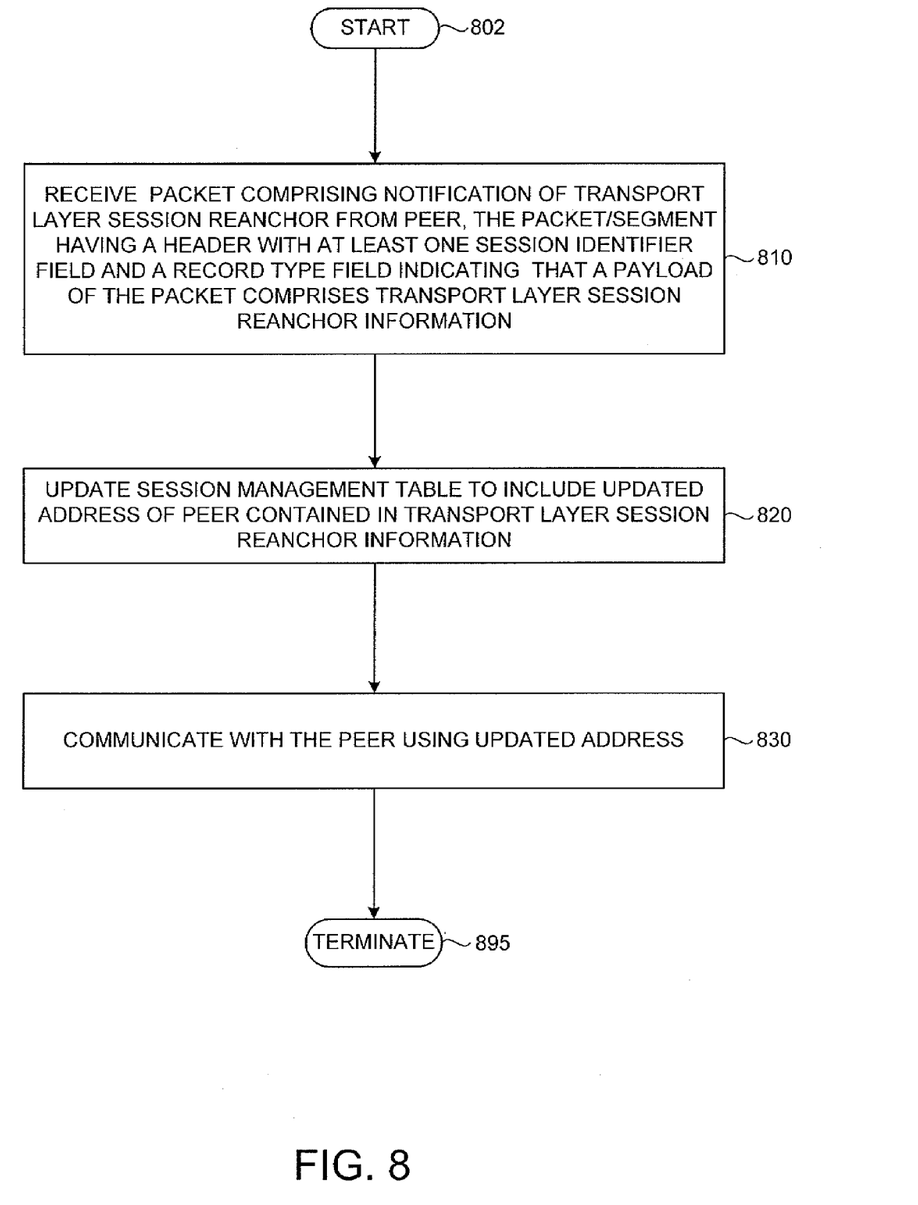
FIG. 8 illustrates a flowchart of a further method for re-anchoring a transport layer session, according to the present disclosure.

FIG. 8 illustrates a flowchart of an additional method 800 for re-anchoring a transport layer session according to the present disclosure. In one embodiment, the method 800 may be performed by a device or a system that is a destination host of an ongoing session with a requesting host. For example, the method 800 may be performed by UE 151 that is in a communication session (using TCPv2) with UE 101 in FIG. 1. In one embodiment, the steps/functions/operations of method 800 may be performed by a computing device 900 as described in connection with FIG. 9. The method 800 begins at step 802 and proceeds to step 810.

At step 810, the method 800 receives a packet comprising a notification of a transport layer session re-anchoring. For example, two peer hosts may have an established session (e.g., a TCPv2 session). In one embodiment, the requesting host may seek to initiate a re-anchoring of the session to a new IP address. For instance, the requesting host may wish to re-anchor the session from a cellular connection to a WLAN connection, or vice versa. The session re-anchoring notification may be received in the form of a session re-anchoring packet 700 of FIG. 7, and as described above. In particular, the session re-anchor packet includes one or more session identifiers (e.g., a RSID and/or SSID) that identify the session to which the packet belongs along with a payload containing session re-anchor information. In one embodiment, the session re-anchor information includes at least a new IP address (e.g., associated with the requesting host) to which the transport layer session should be re-anchored.

In one embodiment, the packet is encrypted using a session key, as described above. In particular, during session setup the peer hosts may have selected and negotiated a session key derived from the hosts' respective secret keys. Ideally, only the hosts that were part of the initial session key creation know the session key. As such, authentic session re-anchor messages can be separated from malicious re-anchor requests. For instance, if applying the session key to a received re-anchoring request, only an authentic session re-anchor request should be properly decrypted.

At step 820, the method 800 updates a session management table to include the updated/new IP address associated with the peer host (e.g., the requesting host) contained in the session re-anchor information. Notably, the method 800 may consult such a session management table for various purposes such as determining whether and how often to send acknowledgment messages, if and when to timeout, when to resend unacknowledged packets, and the like. In one embodiment, the method 800 refers to a destination IP address field in such a session management table to determine which destination IP address to use when encapsulating a TCPv2 packet in an IP header for transmission though the communication network(s) between the hosts on the session.

At step 830, the method 800 communicates with the peer using the updated IP address. For instance, the method 800 refers to a destination IP address field in such a session management table to determine which destination IP address to use when encapsulating a TCPv2 packet in an IP header for transmission though the communication network(s) between the hosts on the session. Thus, subsequent TCPv2 packets (e.g., data packets, OA&M message packets, etc.) are encapsulated in an IP header and routed through the communication network(s) between the hosts using the new destination IP address. Note that any intermediate devices in any of the communication network(s) between the two hosts are unaware of any session information and only need the destination IP address to complete the routing of packets. As such, the session re-anchoring is accomplished without direct involvement, management or supervision of any in-network devices. In addition, the session re-anchoring (at the transport layer) is completely dissociated from the network layer (e.g., the Internet Protocol layer).

Following step 830, the method 800 proceeds to step 895 where the method terminates.

It should be noted that although not explicitly specified, one or more steps of the respective methods 300 and 800 described herein may include a storing, displaying and/or outputting step as required for a particular application. In other words, any data, records, fields, and/or intermediate results discussed in the method can be stored, displayed, and/or outputted to another device as required for a particular application. Furthermore, steps, operations or blocks in FIGS. 3 and 8 that recite a determining operation or function, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

As mentioned above, embodiments of the present disclosure (broadly referred to as TCPv2) enable re-anchoring of a transport layer session to a new IP address transparently to devices in intervening communication networks (e.g., without any modification of layer 3 routers, and the like). In contrast, prior solutions have involved rerouting of TCP/IP session flows through logic residing in network-based routers, resulting in unnecessary usage of additional resources and other inefficiencies. For example, some prior solutions require session proxies, such as a PDN GW or mobile IP home gateway. As an example, user equipment UE 101 and UE 151 in FIG. 1 may be communicating using TCP/IP session where UE 101 is connected to the evolved packet core (EPC) network 103 via eUTRAN 102 and backhaul network 109. The communication with UE 151 flows through EPC 103 via PDN GW 193 and through access network 195. As described above, serving gateway (SGW) 108 serves as a session anchor point for UE 101 in the EPC 103. For instance, SGW 108 can be assigned as an anchor point for UE 101 by the mobility management entity (MME) 107 such that all communications to and from other networks that involve the UE 101 are routed via SGW 108. Subsequently, UE 101 may establish a WLAN connection (e.g., via IP network 194) and desire to begin receiving the TCP/IP session traffic via the WLAN. One prior solution involves the serving gateway (SOW) 108 (the anchor point for UE 101) receiving all TCP/IP session packets/datagrams for UE 101 and redirecting the flow to the new IP address assigned to UE 101 at the WLAN (i.e., IP network 194). For example, the SGW 108 may replace a destination IP address in the IP header and forward the IP datagram to the substituted IP address.

In contrast, through the above described embodiments of the present disclosure (broadly referred to herein as TCPv2), UE 151 is notified of the new IP address of UE 101. Thus, the IP headers attached to TCPv2 packets sent by UE 151 are addressed directly to the new destination IP address. As such, the session traffic may be routed directly from access network 195 to IP network 194. While it is possible that the routing protocols of one or more domains may still cause packets to be routed through EPC 103, it is not a requirement as in some prior solutions (e.g., where a session proxy such as PDN GW or mobile IP home gateway is necessary). Furthermore, although UE 101 may be an endpoint device of a user subscribing to cellular network services from a cellular provider operating eUTRAN 102 and/or EPC 103, there is no requirement that the cellular provider network continue to manage the ongoing session. Rather, at least in the case where UE 101 is transitioning from a cellular network to a Wi-Fi access network, the session can continue directly between the two hosts over the Internet, without any further involvement of the cellular/LTE network equipment. In addition, the speed of session mobility is greater with embodiments of the present disclosure as compared to other mobility solutions. In particular, in one embodiment only a single message (e.g., REAN) is necessary to enable the session reanchor. In contrast, other mobility solutions typically require the exchange of at least three messages. Further still, TCPv2 enables both endpoints in a session to move at nearly the same time (as long as one does not move in the time it takes for a reanchor request to arrive from the peer).

It should be noted that the above examples are only illustrative. In other words, protocol fields in addition to those described above may be included in the TCPv2 header and/or payload. Similarly, the exemplary record-types/message-types described above are only illustrative in nature. Thus, it should be understood that numerous other, further and different record types for data, OA&M messaging and other purposes fall within the scope of the present disclosure. As mentioned above, embodiments of the present disclosure (TCPv2) are extensible insofar as additional record-types may be created and defined as necessary for various purposes.

In addition, although the above examples describe sessions between only two peer hosts, the present disclosure is no so limited. Namely, in other, further and different embodiments, a TCPv2 session may comprise a multicast session (e.g., a one-to-many type session, a conference type session, and the like involving a plurality of peers in a single session). Internet Protocol version 6 (IPv6) specifically contemplates multicast communications and includes multiple destination IP address fields in the IP header. As such, session establishment packets (e.g. as shown in FIG. 4), data packets, acknowledgment packets, re-anchoring notification packets, and any other type of TCPv2 packet not specifically described herein, may be multicast to various peers at various different IP address. Likewise, any one or more peers in a multicast session may also initiate a re-anchor of its IP address in the same manner described above.

Figure 9:
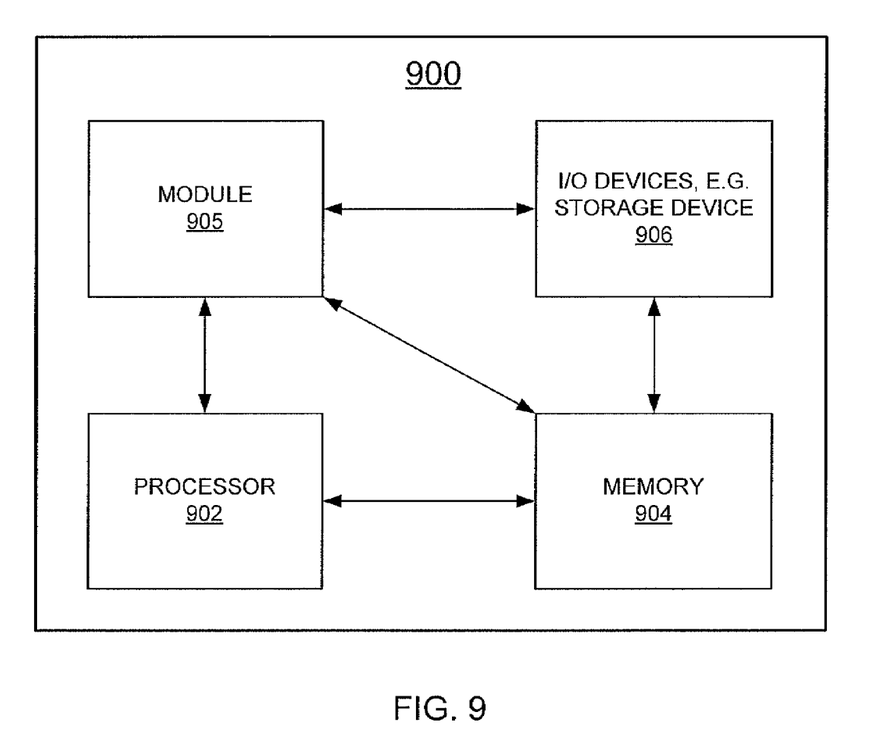
FIG. 9 illustrates a high level block diagram of a general purpose computer suitable for use in performing the methods, operations and functions described herein.

FIG. 9 depicts a high level block diagram of a general purpose computer suitable for use in performing the methods, steps, operations and/or functions described herein. As depicted in FIG. 9, the system 900 comprises a processor element 902 (e.g., a CPU), a memory 904, e.g., random access memory (RAM) and/or read only memory (ROM), a module 905 for establishing or re-anchoring a transport layer session in a communication network, and various input/output devices 906 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps, functions and/or operations of the above disclosed methods. In one embodiment, the present module or process 905 for establishing or re-anchoring a transport layer session in a communication network can be implemented as computer-executable instructions (e.g., a software program comprising computer-executable instructions) and loaded into memory 904 and executed by processor 902 to implement the steps, functions and operations as discussed above. As such, the present process 905 for re-anchoring a transport layer session in a communication network (including associated data structures) of the present disclosure can be stored on a non-transitory (e.g., tangible and physical) computer readable storage medium, e.g., RAM memory, magnetic or optical drive or diskette and the like. In this regard, it should be noted that any one or more of the devices described in connection with the above FIGS. 1-8 may be embodied by one or more instances of the system 900.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for re-anchoring a transport layer session in a communication network, the method comprising:
    receiving, by at least one processor, a request to re-anchor the transport layer session, wherein a transport layer session re-anchor in accordance with the request comprises transferring the transport layer session from a first address to a second address without tearing down the transport layer session, wherein the first address is assigned by a first access point, wherein the second address is assigned by a second access point;
    sending, by the at least one processor to a peer, a packet notifying of the transport layer session re-anchor, wherein the packet includes a header with a session identifier field, and a record type field that indicates that a payload of the packet comprises transport layer session re-anchor information, wherein the packet is encoded with a session key that was negotiated during a setup of the transport layer session; and
    receiving, by the at least one processor, a confirmation of the packet notifying of the transport layer session re-anchor.

2. The method of claim 1, wherein the packet includes the second address to which subsequent packets should be sent by the peer.

3. The method of claim 1, further comprising:
    sending a further packet via the second address in accordance with the transport layer session re-anchor.

4. The method of claim 1, further comprising:
    receiving a further packet via the second address in accordance with the transport layer session re-anchor.

5. The method of claim 1, wherein the confirmation is received from the peer.

6. The method of claim 1, further comprising:
    releasing a previous connection when the confirmation is received.

7. The method of claim 1, wherein the session identifier field is one of a plurality of session identifier fields, the plurality of session identifier fields including a requesting system session identifier field and a serving system session identifier field.

8. The method of claim 1, wherein the record type field is for indicating a type of data contained in the payload of the packet.

9. The method of claim 1, wherein the method is performed by an endpoint device comprising the at least one processor.

10. A method for re-anchoring a transport layer session in a communication network, the method comprising:
   receiving, by at least one processor, a packet comprising a notification of a transport layer session re-anchor from a peer, the packet having a header with a session identifier field, and a record type field indicating that a payload of the packet comprises transport layer session re-anchor information, wherein the packet is encoded with a session key that was negotiated during a setup of the transport layer session, wherein the transport layer session re-anchor comprises transferring the transport layer session from a first address of the peer to a second address of the peer without tearing down the transport layer session, wherein the first address is assigned by a first access point, wherein the second address is assigned by a second access point;
   updating, by the at least one processor, a session management table to include the second address of the peer, wherein the transport layer session re-anchor information comprises the second address of the peer; and
   communicating, by the at least one processor, with the peer using the second address.

11. The method of claim 10, wherein the communicating comprises:
   receiving a further packet from the peer via the second address.

12. The method of claim 10, wherein the communicating comprises:
   sending a further packet to the peer via the second address.

13. The method of claim 10, further comprising:
   sending a confirmation to the peer at the first address, in response to the notification of the transport layer session re-anchor.

14. The method of claim 13, wherein the sending is performed prior to the updating of the session management table.

15. The method of claim 10, wherein the session identifier field is one of a plurality of session identifier fields, the plurality of session identifier fields including a requesting system session identifier field and a serving system session identifier field.

16. The method of claim 10, wherein the record type field is for indicating a type of data contained in the payload of the packet.

17. A non-transitory computer-readable medium storing a plurality of instructions which, when executed by a processor, cause the processor to perform operations for re-anchoring a transport layer session in a communication network, the operations comprising:
   receiving a request to re-anchor the transport layer session, wherein a transport layer session re-anchor in accordance with the request comprises transferring the transport layer session from a first address to a second address without tearing down the transport layer session, wherein the first address is assigned by a first access point, wherein the second address is assigned by a second access point;
   sending, to a peer, a packet notifying of the transport layer session re-anchor, wherein the packet includes a header with a session identifier field, and a record type field that indicates that a payload of the packet comprises transport layer session re-anchor information, wherein the packet is encoded with a session key that was negotiated during a setup of the transport layer session; and
   receiving a confirmation of the packet notifying of the transport layer session re-anchor.

18. The non-transitory computer-readable medium of claim 17, wherein the packet includes the second address to which subsequent packets should be sent by the peer.

19. The non-transitory computer-readable medium of claim 17, further comprising:
   sending a further packet via the second address in accordance with the transport layer session re-anchor.

20. The non-transitory computer-readable medium of claim 17, further comprising:
   receiving a further packet via the second address in accordance with the transport layer session re-anchor.

21. The non-transitory computer-readable medium of claim 17, wherein the confirmation is received from the peer.

22. The non-transitory computer-readable medium of claim 17, further comprising: releasing a previous connection when the confirmation is received.

23. The non-transitory computer-readable medium of claim 17, wherein the session identifier field is one of a plurality of session identifier fields, the plurality of session identifier fields including a requesting system session identifier field and a serving system session identifier field.

24. The non-transitory computer-readable medium of claim 17, wherein the record type field is for indicating a type of data contained in the payload of the packet.

25. The non-transitory computer-readable medium of claim 17, wherein the method is performed by an endpoint device comprising the at least one processor.

26. An apparatus for re-anchoring a transport layer session in a communication network, the apparatus comprising:
   a processor; and
   a non-transitory computer-readable medium storing a plurality of instructions which, when executed by the processor, cause the processor to perform operations, the operations comprising:
      receiving a request to re-anchor the transport layer session, wherein a transport layer session re-anchor in accordance with the request comprises transferring the transport layer session from a first address to a second address without tearing down the transport layer session, wherein the first address is assigned by a first access point, wherein the second address is assigned by a second access point;
      sending, to a peer, a packet notifying of the transport layer session re-anchor, wherein the packet includes a header with a session identifier field, and a record type field that indicates that a payload of the packet comprises transport layer session re-anchor information, wherein the packet is encoded with a session key that was negotiated during a setup of the transport layer session; and
      receiving a confirmation of the packet notifying of the transport layer session re-anchor.

27. The apparatus of claim 26, wherein the packet includes the second address to which subsequent packets should be sent by the peer.

28. The apparatus of claim 26, the operations further comprising:
   sending a further packet via the second address in accordance with the transport layer session re-anchor.

29. The apparatus of claim 26, the operations further comprising:
   receiving a further packet via the second address in accordance with the transport layer session re-anchor.

30. The apparatus of claim 26, wherein the confirmation is received from the peer.

31. The apparatus of claim 26, the operations further comprising:

releasing a previous connection when the confirmation is received.

32. The apparatus of claim 26, wherein the session identifier field is one of a plurality of session identifier fields, the plurality of session identifier fields including a requesting system session identifier field and a serving system session identifier field.

33. The apparatus of claim 26, wherein the record type field is for indicating a type of data contained in the payload of the packet.

34. The apparatus of claim 26, wherein the method is performed by an endpoint device comprising the at least one processor.

35. A non-transitory computer-readable medium storing a plurality of instructions which, when executed by a processor, cause the processor to perform operations for re-anchoring a transport layer session in a communication network, the operations comprising:

receiving a packet comprising a notification of a transport layer session re-anchor from a peer, the packet having a header with a session identifier field, and a record type field indicating that a payload of the packet comprises transport layer session re-anchor information, wherein the packet is encoded with a session key that was negotiated during a setup of the transport layer session, wherein the transport layer session re-anchor comprises transferring the transport layer session from a first address of the peer to a second address of the peer without tearing down the transport layer session, wherein the first address is assigned by a first access point, wherein the second address is assigned by a second access point;

updating a session management table to include the second address of the peer, wherein the transport layer session re-anchor information comprises the second address of the peer; and communicating with the peer using the second address.

36. The non-transitory computer-readable medium of claim 35, wherein the communicating comprises:

receiving a further packet from the peer via the second address.

37. The non-transitory computer-readable medium of claim 35, wherein the communicating comprises:

sending a further packet to the peer via the second address.

38. The non-transitory computer-readable medium of claim 35, further comprising:

sending a confirmation to the peer at the first address, in response to the notification of the transport layer session re-anchor.

39. The non-transitory computer-readable medium of claim 38, wherein the sending is performed prior to the updating of the session management table.

40. An apparatus for re-anchoring a transport layer session in a communication network, the apparatus comprising:

a processor; and a non-transitory computer-readable medium storing a plurality of instructions which, when executed by the processor, cause the processor to perform operations, the operations comprising:

receiving a packet comprising a notification of a transport layer session re-anchor from a peer, the packet having a header with a session identifier field, and a record type field indicating that a payload of the packet comprises transport layer session re-anchor information, wherein the packet is encoded with a session key that was negotiated during a setup of the transport layer session, wherein the transport layer session re-anchor comprises transferring the transport layer session from a first address of the peer to a second address of the peer without tearing down the transport layer session, wherein the first address is assigned by a first access point, wherein the second address is assigned by a second access point;

updating a session management table to include the second address of the peer, wherein the transport layer session re-anchor information comprises the second address of the peer; and communicating with the peer using the second address.

41. The apparatus of claim 40, wherein the communicating comprises:

receiving a further packet from the peer via the second address.

42. The apparatus of claim 40, wherein the communicating comprises:

sending a further packet to the peer via the second address.

43. The apparatus of claim 40, the operations further comprising:

sending a confirmation to the peer at the first address, in response to the notification of the transport layer session re-anchor.

44. The apparatus of claim 43, wherein the sending is performed prior to the updating of the session management table.

* * * * *